United States Patent
Buisset et al.

(10) Patent No.: US 8,497,993 B2
(45) Date of Patent: Jul. 30, 2013

(54) FIELD COMPENSATED STATIC INTERFEROMETER FOR FOURIER TRANSFORM SPECTROSCOPY

(75) Inventors: Christophe Buisset, Le Bar sur Loup (FR); Denis Simeoni, Le Rouret (FR); Patrick Astruc, Mandelieu la Napoule (FR); Cyril Degrelle, Mandelieu la Napoule (FR)

(73) Assignee: Thales, Neuilly sur Seine (FR)

( * ) Notice: Subject to any disclaimer, the term of this patent is extended or adjusted under 35 U.S.C. 154(b) by 481 days.

(21) Appl. No.: 12/852,492

(22) Filed: Aug. 8, 2010

(65) Prior Publication Data

US 2011/0032530 A1 Feb. 10, 2011

(30) Foreign Application Priority Data

Aug. 7, 2009 (FR) ..................................... 09 03904

(51) Int. Cl.
*G01J 3/45* (2006.01)
(52) U.S. Cl.
USPC ......................................................... 356/452
(58) Field of Classification Search
USPC .................................. 356/451, 452
See application file for complete search history.

(56) References Cited

U.S. PATENT DOCUMENTS 6,351,307 B1 * 2/2002 Erskine .......................... 356/451
2006/0232781 A1 * 10/2006 Kranz et al. ................... 356/451

FOREIGN PATENT DOCUMENTS

CA 2 302 994 A1 9/2001

* cited by examiner

*Primary Examiner* — Tarifur Chowdhury
*Assistant Examiner* — Jonathan Hansen
(74) *Attorney, Agent, or Firm* — Baker & Hostetler, LLP

(57) ABSTRACT

A static interferometer comprises an entrance pupil, a splitter plate, a first mirror and a second mirror which are arranged in such a way that light beams originating from a collimated source are divided on the splitter plate, reflect on each of the mirrors and recombine while interfering at the output of the interferometer. The interferometer comprises a prismatic plate of index n comprising a variable thickness $e_j$, the first beam passing through the prismatic plate before reflecting on a reflecting surface of the first mirror, the reflecting surface comprising a plurality of zones, each zone j being situated at a mean distance $\Delta_j$ from a reference plane. The reference plane being perpendicular to an optical axis and corresponding to a position of a plane mirror for which the optical path difference between the two interfering reflected beams is zero, each thickness $e_j$ being substantially equal to $\Delta_j \cdot n/(n-1)$.

9 Claims, 8 Drawing Sheets

US 8,497,993 B2

FIELD COMPENSATED STATIC INTERFEROMETER FOR FOURIER TRANSFORM SPECTROSCOPY

CROSS-REFERENCE TO RELATED APPLICATIONS

This application claims priority to foreign France patent application No. 0903904, filed on Aug. 7, 2009, the disclosure of which is hereby incorporated by reference in its entirety.

FIELD OF THE INVENTION

The present invention relates to the realm of static interferometers. More particularly, the invention pertains to interferometers used for Fourier transform spectroscopy, notably within the framework of Earth observation missions and/or atmospheric probing.

The spectral region to which the invention applies may be notably the infrared band, the UV band or else the visible band.

Finally, the invention proposes a solution to the problem of the field self-apodization effect in a static interferometer used for Fourier transform spectroscopy.

BACKGROUND

In the case of a static interferometer, in order to obtain an intra-pupillary variation in the optical path difference, an existing solution consists in using mirrors, termed "reflecting mirrors", comprising stairs. The reflecting mirrors allow the reflection of the incident beams, previously divided by a splitter plate, so that they are recombined at the output of the interferometer. During recombination, the interference fringes which form exhibit greater or lesser contrast according to the performance of the interferometer and of the angular size of the analysed field.

FIG. 1 represents a case of an embodiment of a prior art staircase interferometer comprising a splitter plate 7 dividing the incident beam originating from a source S into a first beam 4 reflecting on a mirror M2 and into a second beam 3 reflecting on a staircase mirror M1. The two reflected beams 3' and 4' recombine after a second visit to the splitter plate 7. The path difference, denoted $OPD_j$, equal to the optical path difference between the waves 1 and 2 at the output of the interferometer, depends on the distance $\Delta_j$, separating the stair j from the reference plane 5 corresponding to the zero optical path difference.

This solution also makes it possible to avoid any displacement of the reflecting mirrors by an often imposing device.

For each stair, the optical path difference varies as a function of the field angle, inducing a drop in the contrast of the interference fringes in the case of an extended source. This is the phenomenon of self-apodization. This phenomenon limits the maximum field admissible by the interferometer and therefore the instrument's field of view.

The objective of the field compensation is to cancel or to reduce the dependence of the optical path difference, more generally denoted OPD, on the field angle.

Field compensation has been studied in the case of Michelson interferometers for which the variation in the optical path difference is obtained by scanning the position of a mirror of one of the arms of the interferometer along the optical axis.

The principle consists in inserting into one of the arms of the interferometer a plate of thickness, denoted e, and of index, denoted n.

FIG. 2 represents such a device when a mirror $M_1$ is translated by a position $\Delta$ with respect to a reference plane.

The incident beams originating from the source S are split on a splitter plate 7 into two beams 3, 4 reflecting respectively on a first mirror $M_1$ and on a second mirror $M_2$.

The optical path difference, denoted $\delta_{12}$, between the waves which interfere 3', 4' may then be written as a function of the field angle $\theta$:

$$\delta_{12}(e, \Delta, \theta) \approx 2 \cdot \left\{ (n-1) \cdot e + \Delta + \frac{\theta^2}{2} \cdot \left( \frac{n-1}{n} \cdot e - \Delta \right) \right\}$$

For a position $\Delta_1$ of the mirror $M_1$ with respect to the reference plane, there therefore exists a plate thickness $e_1$ making it possible to cancel the dependence of the optical path difference $\delta_{12}$ on the field angle $\theta$:

$$e_1 = \Delta_1 \cdot n/(n-1)$$

The optical path difference $\delta_{12}(e1, \Delta1)$ may then be written:

$$\delta_{21} \approx 2 \cdot (n+1) \cdot \Delta_1$$

This optical path difference is not zero and does not depend on the field angle. There is compensation of the field effect on the interferogram.

A drawback of such a solution is that the device operates on condition that the optical path difference is constant in the plane of the pupil. Furthermore, this device must be adjusted at each position $\Delta$ of the mirror M1.

This solution therefore does not work in the case of a staircase-type static interferometer such as represented in FIG. 1. Indeed, the optical path difference varies in the plane of the pupil, each stair being placed at a position $\Delta_j$ which varies from one stair to another.

An aim of the invention is to alleviate the aforementioned drawbacks.

SUMMARY OF THE INVENTION

The interferometer according to the invention makes it possible to obtain field compensation in the case of a static interferometer.

The solution of the invention consists in placing a prismatic glass plate in an arm of the interferometer.

In this configuration, it is possible to cancel the variation in the optical path difference, OPD, with field angle while using a mirror whose reflecting surface is composed of a plurality of mutually parallel reflecting surfaces called "stairs" whose position varies along the optical axis.

Consequently, the field angle does not degrade the contrast of the interferogram and the self-apodization does not limit the field of the interferometer. The field angle of the instrument can therefore be increased and the size and the mass of the interferometer can be reduced.

Advantageously, the static interferometer comprises an entrance pupil, a splitter plate, a first mirror and a second mirror which are arranged in such a way that light beams originating from a collimated source are divided on the splitter plate, reflect on each of the mirrors and recombine while interfering at the output of the interferometer.

Advantageously, the interferometer comprises at least one prismatic plate of index n, comprising a variable thickness the first beam passing through the prismatic plate before reflecting on a reflecting surface of the first mirror, the reflecting surface comprising a plurality of zones, each zone j being situated at a mean distance $\Delta_j$ from a reference plane, the mean distance $\Delta_j$ varying from one zone to another, the reference plane being perpendicular to an optical axis and corresponding to a position of a plane mirror for which the optical path difference between the two interfering reflected beams is zero, the first mirror M1 and the prismatic plate being positioned in such a way that for a given zone j each thickness $e_j$ is substantially equal to $\Delta_j \cdot n/(n-1)$.

Advantageously, the prismatic plate comprises a face perpendicular to the optical axis comprising a plurality of identical surfaces whose position along the optical axis varies in such a way that the face of the plate forms a stairway.

Advantageously, the prismatic plate comprises a face whose mean slope forms a predetermined angle $\alpha_n$ with respect to the plane perpendicular to the optical axis.

Advantageously, the first mirror is a staircase mirror.

Advantageously, the static interferometer comprises a stack of several interferometer slices, a plate with parallel faces being introduced into a channel of an interferometer slice so as to create a continuity of optical path difference between the various slices.

Advantageously, the first mirror is situated at a predefined distance from the prismatic plate and it is tilted in such a way that the waves are reflected in the same direction as the incident waves.

Advantageously, the angle of tilt $\alpha_n$ of the prism is substantially equal to:

$$\alpha_n = \operatorname{Arctan}\left(\frac{n}{2 \cdot (n^2 - 1)} \cdot \frac{OPD_T}{L_P}\right),$$

where n is the index of the plate, $OPD_T$ the variation in total optical path difference created by the device and LP the width of the pupil of the interferometer.

Advantageously, the inter-stair distance $\epsilon$ along the optical axis is substantially equal to:

$$\varepsilon = \frac{DDM_T}{2 \cdot (n+1) \cdot N},$$

where N is the number of stairs that the mirror comprises.

Advantageously, the first mirror is adjoining one of the faces of the prismatic plate.

Advantageously, the angle of tilt $\alpha_n$ of the prism is substantially equal to:

$$\alpha_n = \operatorname{Arctan}\left(\frac{1}{2 \cdot n} \cdot \frac{OPD_T}{L_P}\right),$$

where n is the index of the plate, $OPD_T$ the variation in total optical path difference created by the device and $L_P$ the width of the pupil of the interferometer.

Advantageously, the inter-stair distance $\epsilon$ along the optical axis is substantially equal to:

$$\varepsilon = \frac{OPD_T}{2 \cdot n \cdot N},$$

where N is the number of stairs that the mirror comprises.

Advantageously, a second prismatic plate is adjoining the first plate in a first channel of the interferometer, the first plate comprising a first index na and the second is positioned in a second channel of the interferometer, the said plate comprising an index identical to that of the first plate.

Advantageously, the first plate and the second plate each comprise at least one tilted face, the tilted face of the first plate being adjoining a tilted face of the second plate, a first angle $\alpha_a$ defining the tilt of the tilted face of the first plate, a second angle $\alpha_b$ defining the tilt of the tilted face of the second plate, the indices and the angles of tilts of each of the plates being determined so as to render negligible the variation in optical path difference with wavelength at the output of the interferometer.

BRIEF DESCRIPTION OF THE DRAWINGS

Other characteristics and advantages of the invention will become apparent with the aid of the description which follows, given with regard to the appended drawings which represent.

DETAILED DESCRIPTION

In the subsequent description, an axis of propagation of the waves in the interferometer is called "an optical axis". More particularly, the description is concerned with the optical axis between the prismatic plate and the mirror situated opposite the prismatic plate.

Figure 1:
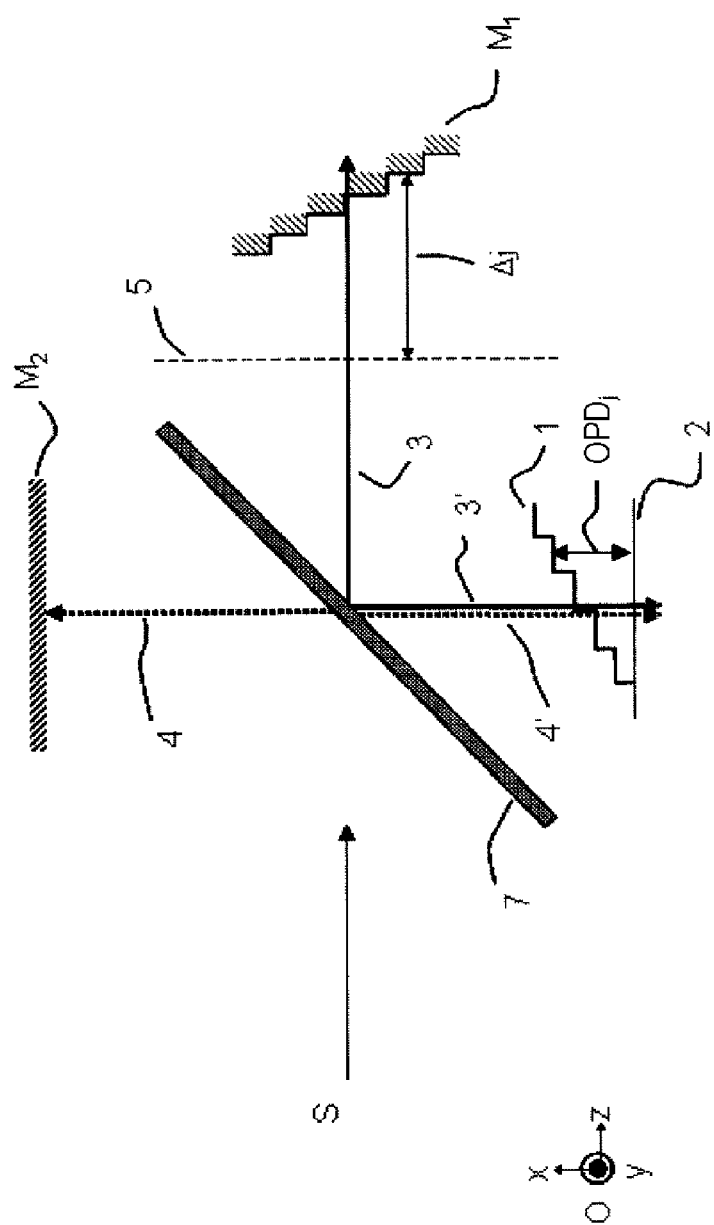
FIG. 1: a staircase-type static interferometer of the prior art.
Figure 2:
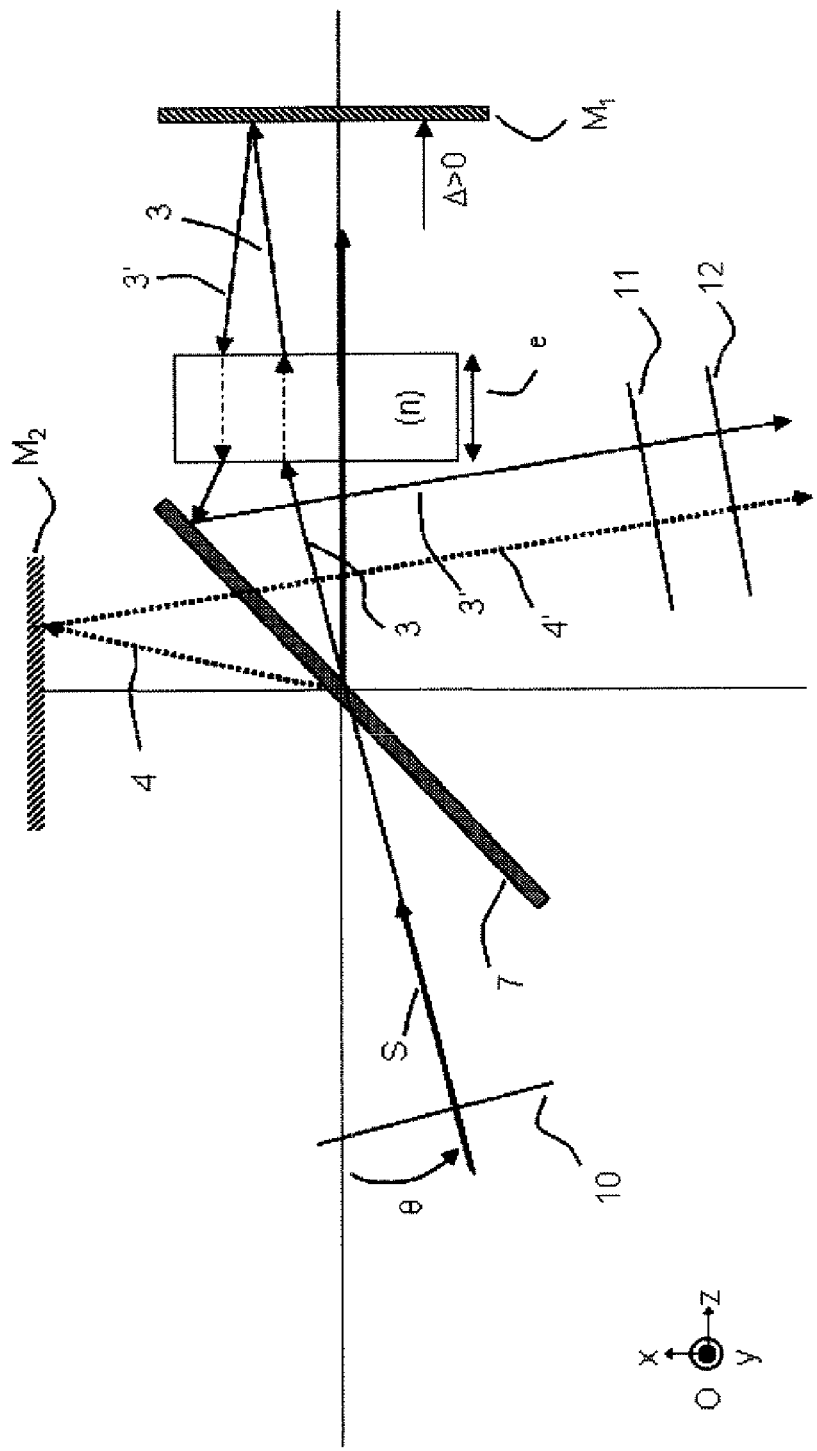
FIG. 2: a field compensated static Michelson interferometer of the prior art.
Figure 3:
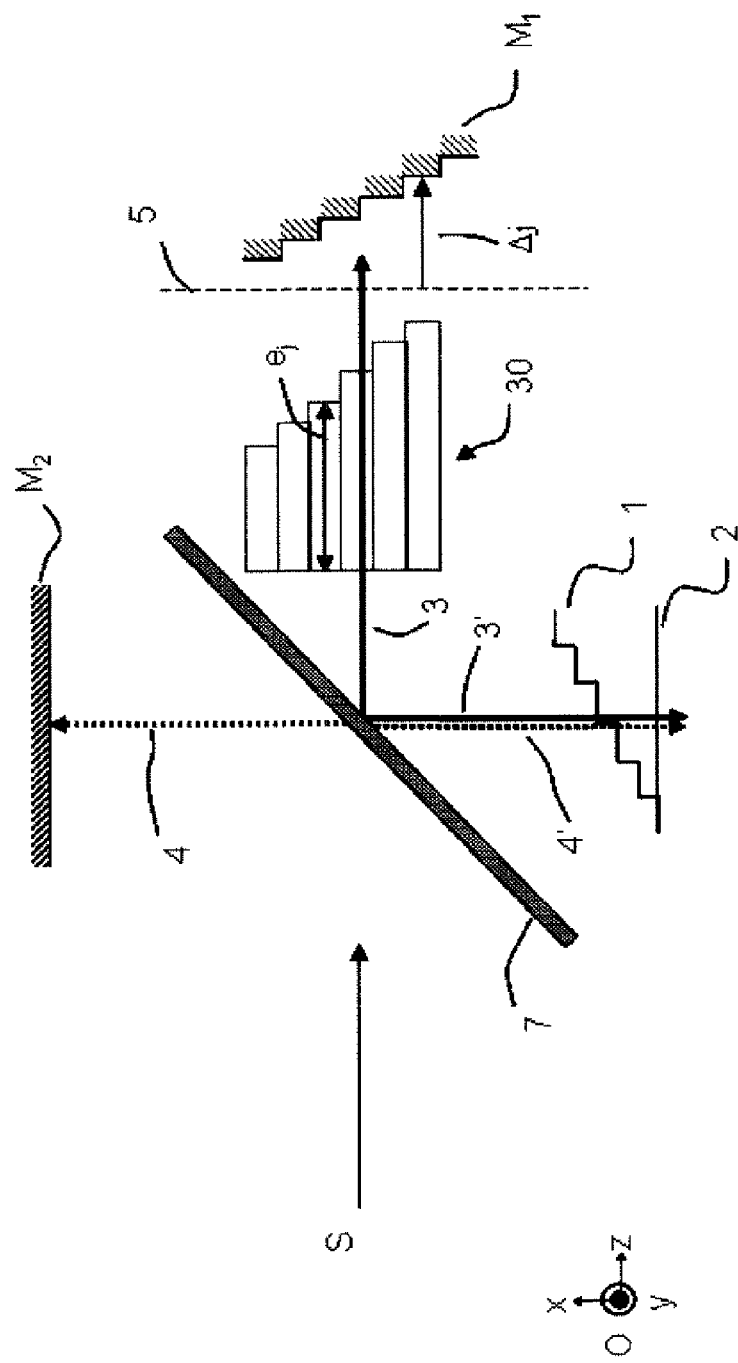
FIG. 3: a staircase-type field compensated static interferometer comprising glass plates according to an embodiment of the invention.

FIG. 3 represents an embodiment comprising a plurality of stacked glass plates and a staircase mirror.

This embodiment, called an "Interferometer with total compensation of field effects", consists in placing opposite each stair, situated at the distance $\Delta_j$ from the reference plane 5, a glass plate of thickness $e_j$.

The mirror $M_1$ is disposed in such a way that each glass plate of thickness $e_j$ is facing a corresponding zone j of the staircase mirror. In this embodiment the zone j is the reflecting surface of a stair.

The reference plane is the plane which corresponds to a position of a plane mirror for which the optical path difference between two interfering reflected beams 3', 4' is zero.

The mirror is oriented so that the reflection of the beams reflecting on the staircase mirror has the same direction along the optical axis as the direction of the incident beams.

The value of the thickness $e_j$ of a glass plate j is then measured according to the following formula: $e_j = \Delta_j \cdot n/(n-1)$.

A so-called "total" compensation of the field effects is therefore obtained for each of the stairs j.

In this embodiment a stack 30 of glass plates is then disposed in one of the arms of the interferometer between the splitter plate 7 and a mirror $M_1$.

Each glass plate corresponds to a stair and possesses a thickness 31 making it possible to obtain for the corresponding stair the desired field compensation. There are therefore as many glass plates as stairs.

The incident beams 3, 4, originating from a source S having been split by the splitter plate 7, are then reflected on the respective mirrors $M_1$ and $M_2$. The beams 3', 4' resulting from the previous reflections are then combined after a second visit passing over or through the splitter plate 7 exhibiting two wavefronts 1, 2 represented in FIG. 3.

The interference fringes then exhibit a strong contrast while being freed of the influence of the field angle.

On the other hand, this embodiment requires the production of a glass block consisting of a stack of glass plates. This embodiment applies more particularly for plate thicknesses of greater than 1 mm typically. This is so as to avoid any birefringence which might be introduced by the glass block and which would consequently reduce the contrast of the interference fringes.

Figure 4:
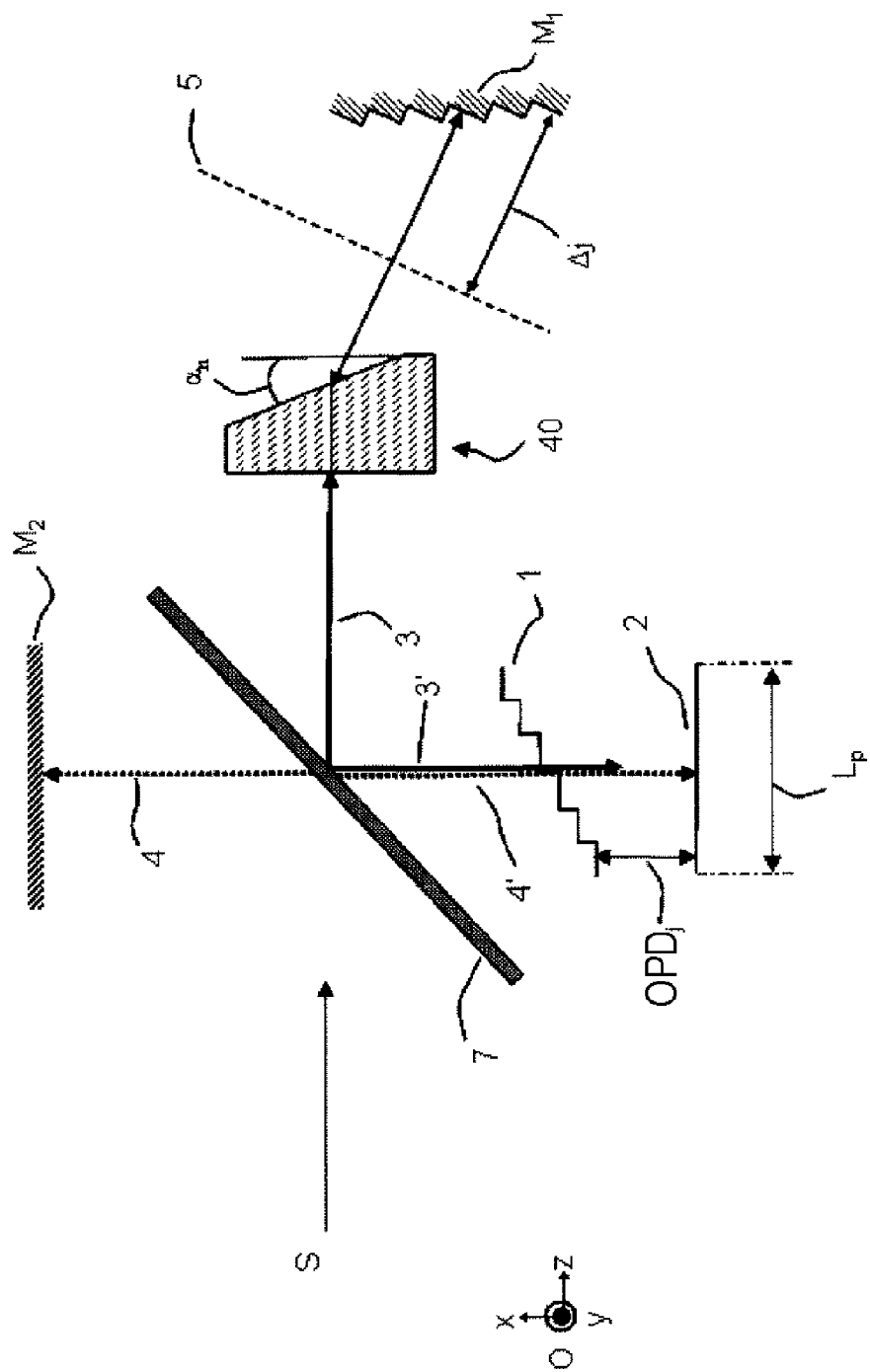
FIG. 4: a staircase-type field compensated static interferometer comprising a prism prismatic plate according to an embodiment of the invention.

FIG. 4 represents a second, preferred, embodiment of an interferometer with total compensation of field effects. In this embodiment, two channels are split by a splitter plate 7 oriented at 45°. One channel allows the waves 4 to reflect on a static plane mirror $M_2$. The second channel allows the waves 3 to pass through a prismatic plate 40 and to reflect on the mirror $M_1$. The prism angle of the prismatic plate is called $\alpha_n$.

In the latter embodiment, the tilt $\alpha_n$ of the exit face of the prismatic plate is chosen as a function of the inter-stair distance of the mirror $M_1$.

The mirrors $M_1$ and $M_2$ are oriented so as to be in self-collimation for a beam originating from the centre of the field. That is to say the orientation of the mirror $M_1$ is determined so that the directions of the waves respectively incident and reflected on the mirror $M_1$ are identical.

The optical path differences depend on the distances, denoted $\Delta_j$, between each stair and between a reference plane 5. The reference plane corresponds to a position of a plane mirror for which the optical path difference between the two interfering reflected beams 3', 4' is zero.

The wavefronts 1 and 2 are represented at the output of the interferometer between the beams 3' and 4' reflected on the mirrors $M_1$ and $M_2$.

The width of the pupil of the interferometer at the output is denoted $L_P$ and the optical path difference for a beam reflecting on a stair j is denoted at the output of the interferometer $OPD_j$.

Figure 5:
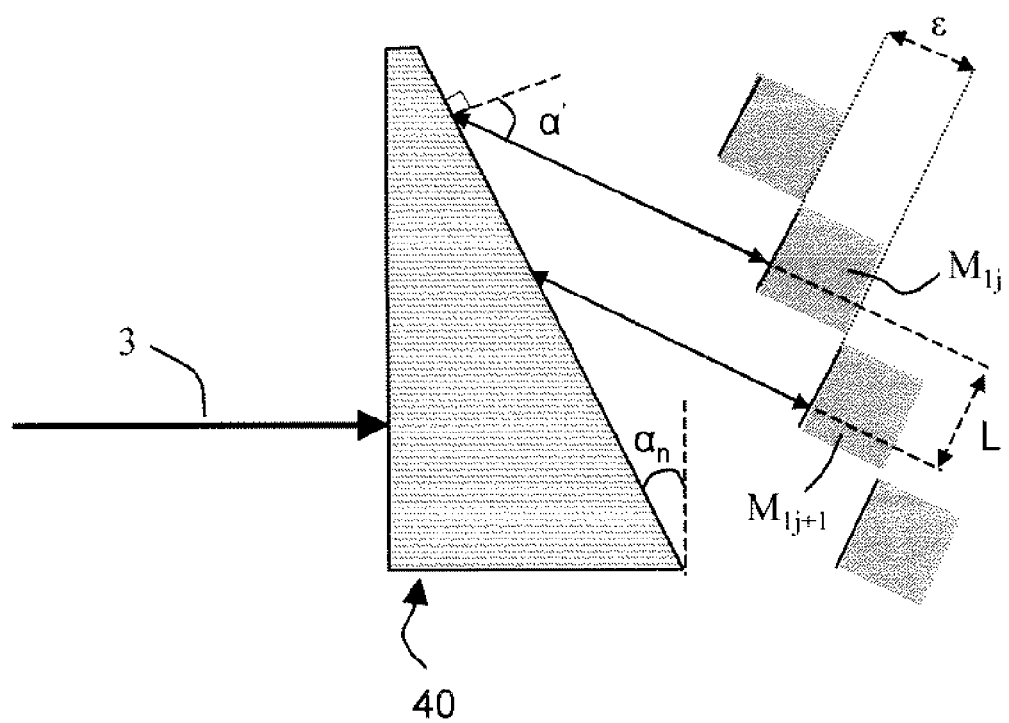
FIG. 5: a prismatic plate facing a staircase mirror.

FIG. 5 represents a part of the interferometer of FIG. 4, the incident beams 3, a prismatic plate 40 and the staircase mirror $M_1$.

The physical parameters of the prismatic plate 40 and of the staircase mirror $M_1$ are as follows:

ε: inter-stair distance along the optical axis.

L: Width of the stairs in the direction perpendicular to the optical axis.

$\alpha_n$: angle of the prism.

α': angle between the emerging beams and the normal to the prism.

In the case of an interferometer with total compensation of field effects, the physical parameters ε, α' and αn may be written:

$$\alpha_n = \text{Arctan}\left(\frac{n}{2 \cdot (n^2 - 1)} \cdot \frac{OPD_T}{L_P}\right)$$

$$\alpha' = \arcsin[n \cdot \sin(\alpha_n)]$$

$$\varepsilon = \frac{OPD_{Max}}{2 \cdot (n+1) \cdot N}$$

where:

N: number of stairs that the staircase mirror comprises;

$OPD_T$: variation in the total optical path difference created by the device;

n: index of the component material of the prismatic plate;

Lp: width of the pupil of the interferometer.

One of the main advantages of the device according to the invention is that it allows total compensation of the field effects and therefore makes it possible to eliminate the self-apodization phenomenon.

Furthermore, the invention allows an improvement in the signal gain for a state of the art interferometer of comparable size. It is also possible to use a pupillary magnification to reduce the size and the mass of static interferometers. Moreover, the device according to the invention allows the use of standard optical components not posing any major production problem.

Finally, the invention does not introduce any birefringence induced by the production of the component.

Figure 6A:
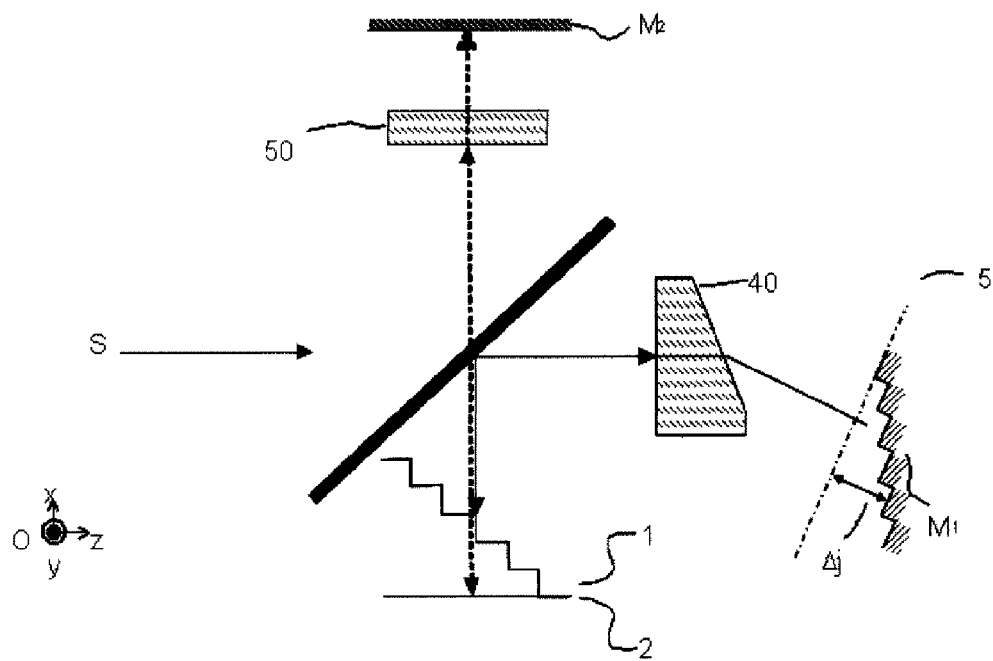
FIG. 6A: a first interferometer slice
Figure 6B:
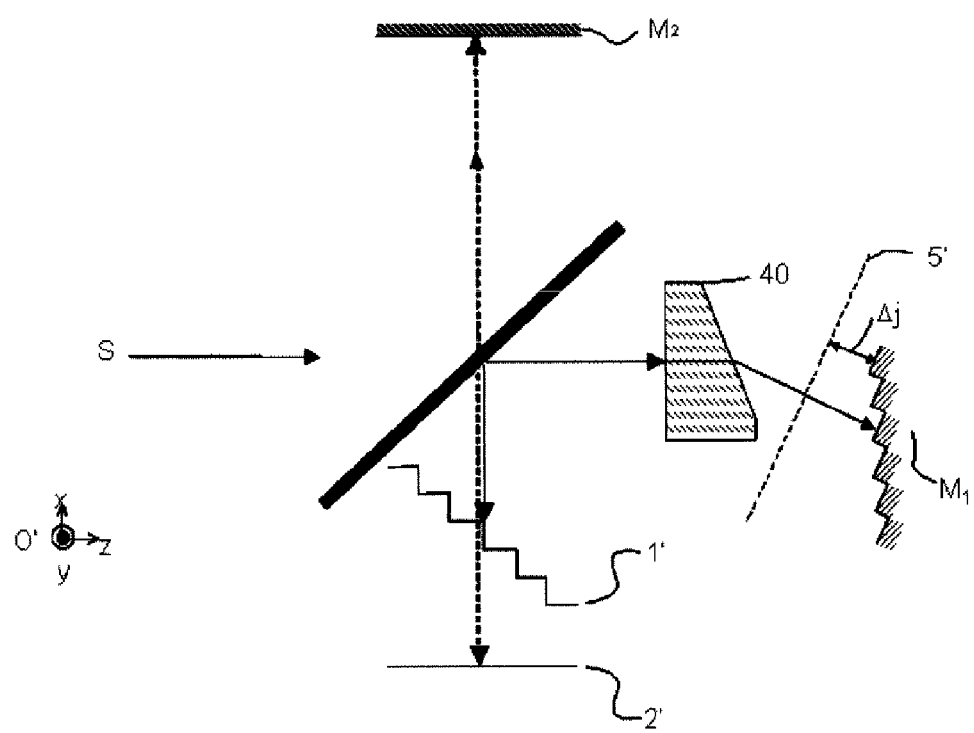
FIG. 6B: a second interferometer slice

FIGS. 6A and 6B represent a variant embodiment of an interferometer with total compensation of field effects and for which the interferometer is formed by stacking two interferometer slices.

A portion of the interferometer in which a glass plate may be introduced in front of one of the mirrors in such way as to form two wavefronts having a first given characteristic at the output of the interferometer is called an interferometer slice. A second portion of the interferometer does not comprise any glass plate. In this second portion, called a slice, two other wavefronts exhibit a second given characteristic.

The said given characteristics of each of the said wavefronts make it possible to achieve wider coverage of the optical path differences at the output of the interferometer.

This solution makes it possible to create a optical path difference offset $\Delta_j$ represented in the form of the offset of the reference plane 5 and 5' in a first portion of the interferometer.

Another solution could have been to employ mirrors comprising two parts each. A first part of the mirror M1 and a first part of the mirror M2 having a first disposition in a plane (O, x, y, $z_1$) in a first slice and a second part of the mirror M1 and a second part of the mirror M2 in a second slice being disposed in a plane (O, x, y, $z_2$).

On the other hand the latter solution is more complex to implement, the mirrors M1 and M2 then having to comprise a discontinuity in their reflecting surface which comprises two parts.

In variant embodiments it is possible to stack a plurality of interferometer slices while disposing glass plates of various thicknesses in each slice.

In the first slice of the interferometer represented in FIG. 6A, the introduction of an additional glass thickness, represented in the form of the parallel faced plate 50, in the channel of the mirror $M_2$, makes it possible to achieve an optical path difference offset $\Delta_j$ represented in the form of the offset of the reference plane 5 and 5'.

The offset is achieved without modifying the device of the opposite channel formed by the prism 40 and the mirror $M_1$. If the thickness of the glass plate 50 is adjusted in relation to the optical path difference produced by the mirror $M_1$, and represented by the maximum gap between the waves 1 and 2, the elimination of glass plate 50, eliminated in FIG. 6B in the second slice of the interferometer, makes it possible to offset the wavefront 2 into a wavefront 2'. This embodiment makes it possible to achieve continuous coverage of the optical path differences between the two interferometer slices.

The benefit of this embodiment is that it enables the angle of the prism 40 to be reduced by half or more for a given total optical path difference and for a given width of the interferometer. Furthermore, the device formed by the prism 40 and the mirror $M_1$ is common to all the interferometer slices.

A fourth embodiment makes it possible to have a prismatic plate 70 whose exit face is adjoining in relation to a staircase mirror $M_1$.

Figure 7:
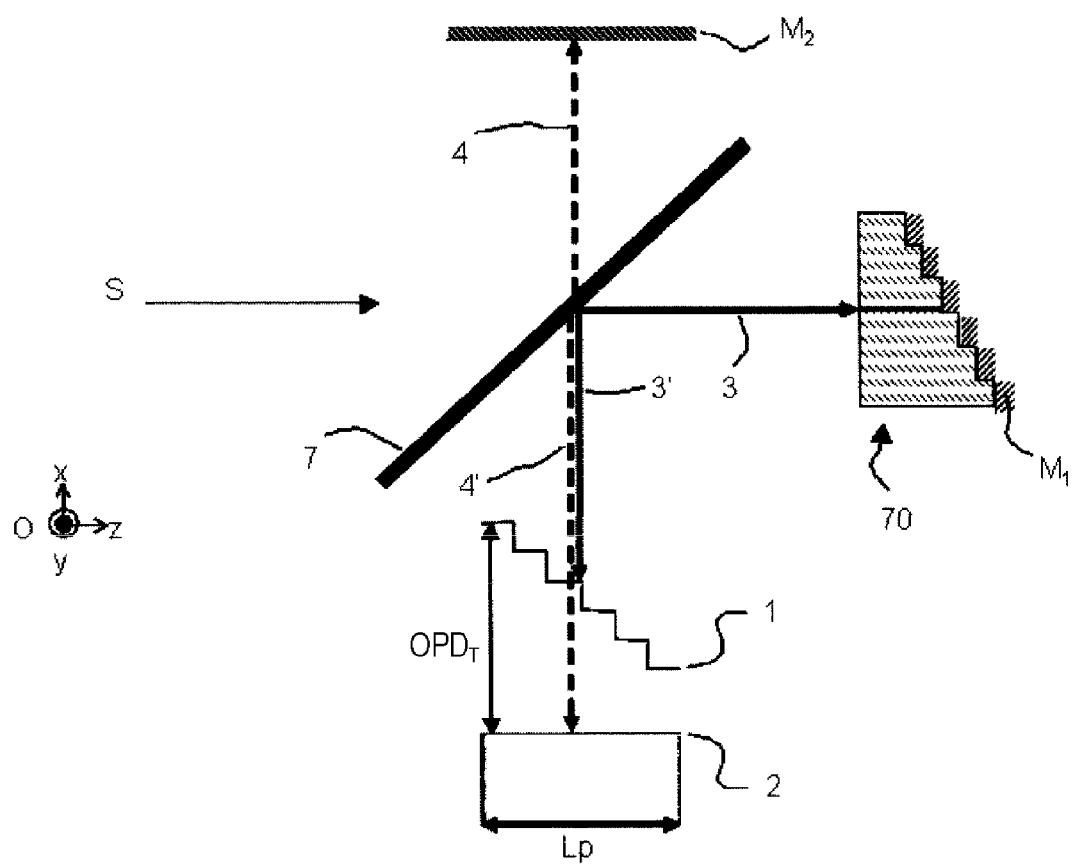
FIG. 7: a staircase-type field compensated static interferometer comprising a stairway-shaped prismatic plate and a staircase mirror.

FIG. 7 represents another exemplary embodiment of a device for compensating the effects of fields. This device, called an "Interferometer with partial compensation of the field effects" comprises a glass block 70 one of whose faces is cut so as to exhibit a plurality of identical surfaces. These surfaces are oriented perpendicularly to the optical axis and their position along the optical axis varies from one stair to another.

These surfaces may be coated with a reflecting treatment replacing the reflecting function of the mirror M1. In this embodiment, they therefore have a reflecting function and they thus constitute the staircase mirror of this channel of the interferometer.

In this exemplary embodiment, each stair is separated by a distance $\epsilon$ from the previous. In this embodiment, this distance is the same whatever the stair considered.

The alternative represented in FIG. 4 and in FIG. 5 remains valid in the case of an interferometer with partial compensation of the field effects.

In this case, the parameter expressions $\alpha_n$, $\alpha'$ and $\epsilon$ defined previously are as follows:

$$\alpha_n = \text{Arctan}\left(\frac{1}{2 \cdot n} \cdot \frac{OPD_T}{L_P}\right)$$

$$\alpha' = \text{Arcsin}[n \cdot \sin(\alpha_n)]$$

$$\varepsilon = \frac{OPD_{Max}}{2 \cdot n \cdot N}$$

where:
N: number of stairs that the staircase mirror comprises;
$OPD_T$: variation in the total optical path difference created by the device;
n: index of the component material of the prismatic plate;
Lp: width of the pupil of the interferometer.

One of the main advantages of the device according to the invention is that it allows an appreciable attenuation of the field effects and therefore of the self-apodization phenomenon.

Furthermore, the invention allows an improvement in the signal gain for a state of the art interferometer of comparable size. It is also possible to use a pupillary magnification to reduce the size and the mass of static interferometers. Moreover, the device according to the invention allows the use of standard optical components that can be produced simply.

Finally, the invention does not introduce any birefringence induced by the production of the component.

Figure 8:
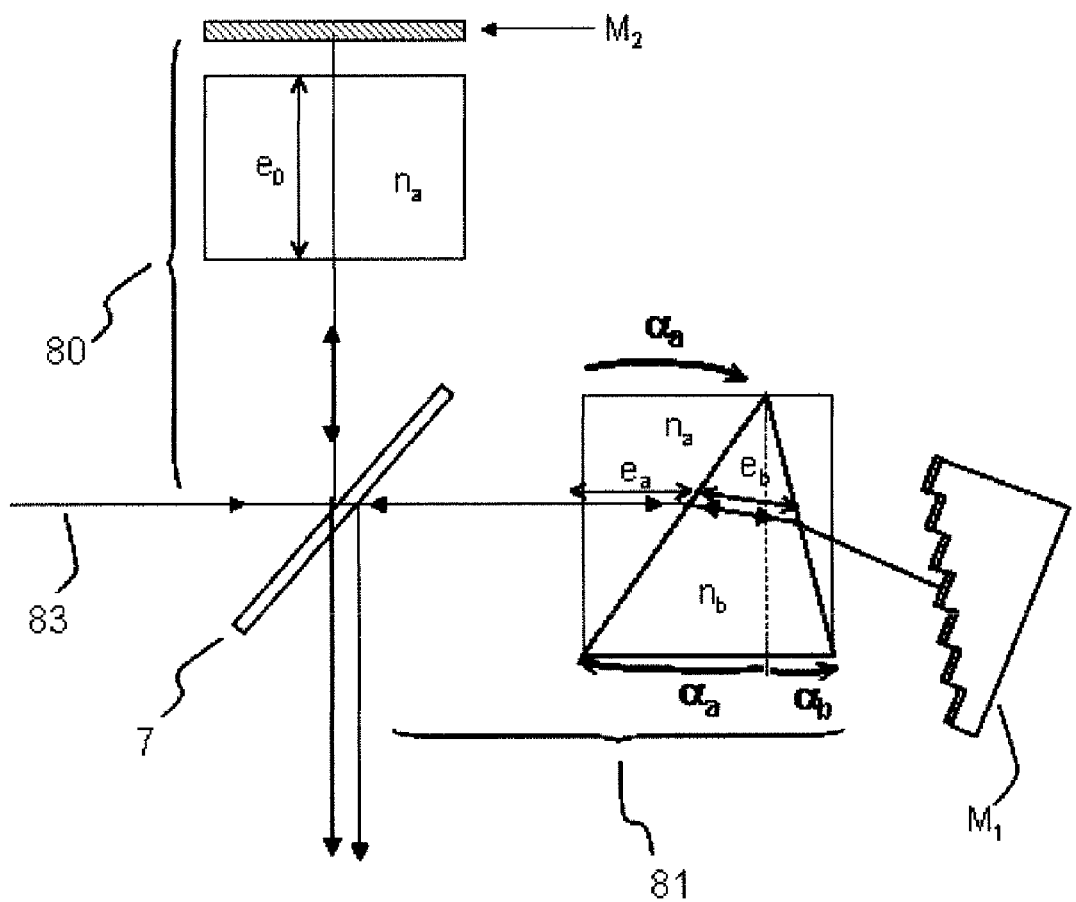
FIG. 8: a staircase-type field compensated static interferometer comprising an achromatic field compensation.

FIG. 8 represents another exemplary embodiment of a device for compensating the effects of fields. In this exemplary embodiment, the field compensation is carried out on the basis of a set of two prisms of different materials and angles. This device makes it possible to circumvent the variation in the optical path difference with wavelength.

In this exemplary embodiment, one first channel 80 of the interferometer, dubbed the "Slow channel", comprises a plate of material of index $n_a$ followed by a plane mirror M2. One of the faces of this plate may be covered with a reflecting deposition which thus acts as a plane mirror.

The second channel 81, dubbed the "Fast channel", consists of two adjoining prisms, of materials of different indices $n_a$ and $n_b$ and of different vertex angles respectively $\alpha_a$ and $\alpha_a + \alpha_b$, followed by a staircase mirror $M_1$.

FIG. 8 represents the trajectories of a ray 83 intercepting a stair along the two channels of the interferometer. For the ray represented, the optical path difference, between the slow and fast channels, experienced by a ray propagating along the optical axis may be written:

$$OPD = 2 \cdot [n_a \cdot (e_0 - e_a) + n_b \cdot e_b + L_1 - L_2].$$

where:
$e_0$: glass thickness traversed by the ray propagating in the slow channel of the interferometer through the material of index $n_a$.
$e_a$: glass thickness traversed by the ray propagating in the fast channel of the interferometer through the material of index $n_a$.
$e_b$: glass thickness traversed by the ray propagating in the fast channel of the interferometer through the material of index $n_b$.
$L_1$: air thickness traversed by the ray propagating in the slow channel of the interferometer between the exit face of the plate of index $n_a$ and the staircase mirror.
$L_2$: air thickness traversed by the ray propagating in the fast channel of the interferometer between the exit face of the plate of index $n_b$ and the staircase mirror.

The variation in this optical path difference as a function of wavelength $\lambda$ may be written:

$$\frac{\partial OPD}{\partial \lambda} = 2 \cdot \left[\frac{\partial n_a}{\partial \lambda} \cdot (e_0 - e_a) - \frac{\partial n_b}{\partial \lambda} \cdot e_b\right]$$

The variations of index $dn_a/d\lambda$ and $dn_b/d\lambda$ of the respective materials of index $n_a$ and $n_b$ have the same sign. The variation of optical path as a function of wavelength on the slow channel therefore compensates that on the fast channel.

In an approximation to 1st order, this embodiment makes it possible to define an achromatic optical path difference. That is to say an interferometer configuration is obtained in which the ratio of the differential of glass thickness traversed in the two glasses is equal to the ratio of the index slopes.

$$\frac{\Delta e_{na}}{\Delta e_{nb}} = -\frac{\frac{dn_b}{d\lambda}}{\frac{dn_a}{d\lambda}}$$

where: $\Delta e_{na} = e_0 - e_a$ and $\Delta e_{nb} = e_b$

The angles $\alpha_a$ and $\alpha_b$ of the prisms made of materials of indices $n_a$ and $n_b$ are calculated and optimized so as to render negligible the variation in the optical path difference with wavelength at the output of the interferometer This achromatic field compensation device is valid both in the case of partial field compensation and the case of total field compensation.

In these various embodiments, the invention exhibits the advantage of allowing a wider admissible field at the input of the interferometer. The admissible field is wider notably because the dependence between the field angle and the optical path difference between two waves which interfere is considerably reduced.

The invention claimed is:

1. A static interferometer comprising an entrance pupil, a splitter plate, a first mirror and a second mirror which are arranged in such a way that light beams originating from a collimated source are divided on the splitter plate, reflect on each of the mirrors and recombine while interfering at the output of the interferometer, the static interferometer further comprising:

at least one prism of index n, having a face whose slope forms a predetermined angle $\alpha_n$ with respect to a plane perpendicular to an optical axis, thus having a variable thickness $e_j$, a first beam passing through the at least one prism before reflecting on a reflecting surface of the first mirror, the first mirror being a staircase with the reflecting surface comprising a plurality of zones, each zone j being situated at a mean distance $\Delta_j$ from a reference plane, the mean distance $\Delta_j$ varying from one zone to another, tilted in such a way that the first beam incident on the first mirror is reflected in a same direction as the first incident beam, the reference plane being perpendicular to an optical axis and corresponding to a position of a plane mirror for which the optical path difference between the two interfering reflected beams is zero, the first mirror and the at least one prism being positioned in such a way that for a given zone j each thickness $e_j$ is substantially equal to $\Delta_j n/(n-1)$, wherein the angle of tilt $\alpha_n$ of the prism is substantially equal to $$\alpha_n = \operatorname{Arctan}\left(\frac{n}{2\cdot(n^2-1)} \cdot \frac{OPD_T}{L_P}\right),$$

where n is the index of the plate, $OPD_T$ the variation in total optical path difference created by the device and $L_P$ the width of the pupil of the interferometer.

2. The static interferometer according to claim 1, further comprising:
a stack of several interferometer slices, wherein a plate with parallel faces is introduced into a channel of an interferometer slice so as to create a continuity of optical path difference between the various slices.

3. The static interferometer according to claim 1, wherein said first mirror is situated at a predefined distance from the prism.

4. The static interferometer according to claim 3, wherein a second prism is adjoining the at least one prism which is positioned in a first channel of the interferometer, a plate is positioned in a second channel of the interferometer.

5. The static interferometer according to claim 1, wherein an inter-stair distance $\epsilon$ along the optical axis is substantially equal to $$\varepsilon = \frac{OPD_T}{2\cdot(n+1)\cdot N},$$

where N is the number of stairs that the first mirror comprises.

6. A static interferometer, comprising:
an entrance pupil, a splitter plate, a first mirror and a second mirror which are arranged in such a way that light beams originating from a collimated source are divided on the splitter plate, reflect on each of the mirrors and recombine while interfering at the output of the interferometer, the static interferometer further comprising:

at least one prism of index n, a first beam passing through the at least one prism before reflecting on a reflecting surface of the first mirror, the first mirror being a staircase with the reflecting surface comprising a plurality of zones, each zone j being situated at a mean distance $\Delta_j$ from a reference, the mean distance $\Delta_j$ varying from one zone to another, tilted in such a way that the first beam incident on the first mirror is reflected in a same direction as the first incident beam, the reference plane being perpendicular to an optical axis and corresponding to a position of a plane mirror for which the optical path difference between the two interfering reflected beams is zero, the first mirror and the at least one prism being positioned in such a way that for a given zone j each thickness $e_j$ is substantially equal to $\Delta_j n/(n-1)$ wherein said at least one prism comprises a face perpendicular to the optical axis, said face comprising a plurality of identical surfaces whose position along the optical axis varies in such a way that the face of the plate forms a stairway, whose mean slope forms a predetermined angle $\alpha_n$ with respect to the plane perpendicular to the optical axis, wherein said angle of tilt $\alpha_n$ of the prism is substantially equal to:

$$\alpha_n = \operatorname{Arctan}\left(\frac{1}{2\cdot n} \cdot \frac{OPD_T}{L_P}\right),$$

where n is the index of the plate, $OPD_T$ a variation in a total optical path difference created by the interferometer, and $L_P$ a width of the pupil of the interferometer.

7. A static interferometer comprising an entrance pupil, a splitter plate, a first mirror and a second mirror which are arranged in such a way that light beams originating from a collimated source are divided on the splitter plate, reflect on each of the mirrors and recombine while interfering at the output of the interferometer, the static interferometer further comprising:

at least one prism of index n, having a face whose slope forms a predetermined angle $\alpha_n$ with respect to a plane perpendicular to an optical axis, thus having a variable thickness $e_j$, a first beam passing through the at least one prism before reflecting on a reflecting surface of the first mirror, the first mirror being a staircase with the reflecting surface comprising a plurality of zones, each zone j being situated at a mean distance $\Delta_j$ from a reference plane, the mean distance $\Delta_j$ varying from one zone to another, tilted in such a way that the first beam incident on the first mirror is reflected in a same direction as the first incident beam, the reference plane being perpendicular to an optical axis and corresponding to a position of a plane mirror for which the optical path difference between the two interfering reflected beams is zero, the first mirror and the at least one prism being positioned in such a way that for a given zone j each thickness $e_j$ is substantially equal to $\Delta_j n/(n-1)$, wherein the at least one prism forms an angle of tilt $\alpha_n$ with respect to the plane perpendicular to the optical axis, the angle $\alpha_n$ being substantially equal to:

$$\alpha_n = \text{Arctan}\left(\frac{1}{2 \cdot n} \cdot \frac{OPD_T}{L_P}\right)$$

where n is the index of the plate, $OPD_T$ a variation in a total optical path difference created by the interferometer, and $L_P$ a width of the pupil of the interferometer.

8. The static interferometer according to claim 7, wherein an inter-stair distance $\epsilon$ along the optical axis is substantially equal to:

$$\varepsilon = \frac{OPD_T}{2 \cdot n \cdot N},$$

where N is the number of stairs that the mirror comprises.

9. The static interferometer according to claim 8, wherein said each at least one prism and the second prism comprise at least one tilted face, the tilted face of the at least one prism being adjoining a tilted face of the second prism, a first angle $\alpha_a$ defining the tilt of the tilted face of the at least one prism, a second angle $\alpha_b$ defining the tilt of the tilted face of the second prism, the indices and the angles of tilts of each of the at least one prism and the second prism being determined so as to render negligible the variation in the optical path difference with a wavelength at an output of the interferometer.

* * * * *